(12) United States Patent
Park et al.

(10) Patent No.: US 9,981,653 B2
(45) Date of Patent: May 29, 2018

(54) SYSTEM AND METHOD FOR REDUCING EXHAUST GAS OF HYBRID ELECTRIC VEHICLE

(71) Applicants: Hyundai Motor Company, Seoul (KR); Kia Motor Corporation, Seoul (KR)

(72) Inventors: Joonyoung Park, Seoul (KR); Gyuhong Kim, Suwon-si (KR); Tae Woo Kim, Anyang-si (KR); Sang Joon Kim, Seoul (KR); Jeamun Lee, Seoul (KR); Yong Kak Choi, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 179 days.

(21) Appl. No.: 14/937,328

(22) Filed: Nov. 10, 2015

(65) Prior Publication Data

US 2016/0297424 A1 Oct. 13, 2016

(30) Foreign Application Priority Data

Apr. 9, 2015 (KR) .................. 10-2015-0050363

(51) Int. Cl.
| | |
|---|---|
| *B60W 20/16* | (2016.01) |
| *F01N 3/20* | (2006.01) |
| *B60W 50/00* | (2006.01) |
| *B60W 10/06* | (2006.01) |
| *B60W 10/08* | (2006.01) |

(52) U.S. Cl.
CPC ........ *B60W 20/16* (2016.01); *B60W 50/0097* (2013.01); *F01N 3/2006* (2013.01); *B60W 10/06* (2013.01); *B60W 10/08* (2013.01); *B60W 2510/244* (2013.01); *B60Y 2200/92* (2013.01); *B60Y 2300/182* (2013.01); *B60Y 2300/43* (2013.01); *B60Y 2300/60* (2013.01); *Y02T 10/6291* (2013.01); *Y02T 10/84* (2013.01); *Y10S 903/93* (2013.01)

(58) Field of Classification Search
None
See application file for complete search history.

(56) References Cited

FOREIGN PATENT DOCUMENTS

| | | |
|---|---|---|
| JP | H11-022503 A | 1/1999 |
| JP | 2010-064499 A | 3/2010 |
| JP | 2013-056614 A | 3/2013 |
| JP | 2014-080163 A | 5/2014 |

(Continued)

*Primary Examiner* — Rami Khatib
*Assistant Examiner* — Gerrad A Foster
(74) *Attorney, Agent, or Firm* — Brinks Gilson & Lione

(57) ABSTRACT

A system and a method for reducing exhaust gas of a hybrid electric vehicle are disclosed. A system for reducing exhaust gas of a hybrid electric vehicle according to an exemplary form of the present disclosure may include: a battery management system measuring a state of charge (SOC) of a high voltage battery of the hybrid electric vehicle; a motor control unit controlling a driving motor with power of the high voltage battery to generate motor driving force; an engine control unit controlling an engine to generate engine driving force; and a hybrid control unit checking an all electric range (AER) according to a driving in a charge depleting (CD) mode of the hybrid electric vehicle to perform a catalyst heating and warm up control by starting the engine in the CD mode in the case in which the checked AER exceeds a reference AER.

12 Claims, 7 Drawing Sheets

(56) References Cited

FOREIGN PATENT DOCUMENTS

| | | | |
|---|---|---|---|
| JP | 5553019 | B2 | 7/2014 |
| JP | 2014-530786 | A | 11/2014 |
| KR | 10-0387487 | B | 6/2003 |

SYSTEM AND METHOD FOR REDUCING EXHAUST GAS OF HYBRID ELECTRIC VEHICLE

CROSS-REFERENCE TO RELATED APPLICATION

This application claims the benefit of Korean Patent Application No. 10-2015-0050363, filed on Apr. 9, 2015, which is incorporated herein by reference in its entirety.

FIELD

The present disclosure relates to a system and a method for reducing exhaust gas of a hybrid electric vehicle.

BACKGROUND

The statements in this section merely provide background information related to the present disclosure and may not constitute prior art.

In general, in accordance with the endless requirement for an improvement of fuel efficiency of a vehicle and the tightening of exhaust gas regulations of each country, the demand for an environmentally-friendly vehicle is increased. As a practical alternative thereof, a hybrid electric vehicle and a plug-in hybrid electric vehicle (hereinafter, referred to as hybrid electric vehicle) have been provided.

The hybrid electric vehicle uses an engine and a motor as a power source, and provides the improvement of fuel efficiency and a reduction of the exhaust gas by using characteristics of the engine and the motor according to a driving situation.

Typically, a driving manner of the hybrid electric vehicle supports a charge depleting (CD) mode and a charge sustaining (CS) mode.

Here, the CD mode, which actively uses electric energy charged in a battery by an external power source, is a mode starting the engine only in the case in which required power is not satisfied by a driving motor.

The CS mode is a mode charging or discharging the battery after the electric energy charged in the battery is consumed to a predetermined level and driving while consuming fuel so that a state of charge (SOC) of the electric energy is maintained at the predetermine level. In this CS mode, in order to maintain system efficiency and the SOC of the battery at the predetermined level, whether or not the engine is started or stopped is determined.

Meanwhile, in the case in which a catalyst heating (CH) and warm up (Wup) control are performed before the power of the engine of the hybrid electric vehicle is actively used, the exhaust gas may be reduced.

Here, in the case in which the engine of the hybrid electric vehicle is driven at a low load which is less than a predetermined speed and a predetermined torque, the catalyst heating and warm up control is appropriately performed.

Thus, in the case in which the required power is small, the engine is driven at the low load and the motor deals with the other driving power, thereby making it possible to maintain the appropriate level of system efficiency and the SOC.

On the other hand, in the case in which the required power is large, in order to satisfy the driving power and appropriately maintain the system efficiency and the SOC, the power of the engine is inevitably used and deterioration of exhaust performance needs to be endured.

For example, FIG. 1 illustrates a warm up control of a case in which required power of a hybrid electric vehicle according to the related art is small.

In addition, FIG. 2 illustrates the warm up control of a case in which required power of the hybrid electric vehicle according to the related art is large.

The hybrid electric vehicle according to the related art conducts the catalyst heating and warm up control of the engine after entering a CS mode from a CD mode.

In this case, as illustrated in FIG. 1, in the case in which the required power according to an initial driving condition after entering the CS mode is small, the catalyst heating and warm up control is performed in a low required power section, thereby improving the exhaust performance.

On the other hand, as illustrated in FIG. 2, in the case in which the required power according to the initial driving condition after entering the CS mode is large, since the catalyst heating and warm up control is performed in a high required power section, the exhaust gas is excessively discharged, thereby deteriorating the exhaust performance.

In order to solve this problem, it may be considered that the engine is started in the CD mode and the catalyst heating and warm up control is performed in advance. However, since this substantially means that the engine is started in the CD mode in advance, a fuel efficiency certification value and marketability are deteriorated due to a decrease in an all electric range (AER).

A related art is disclosed by Korean Patent Document No. 0387487 which was published on Jun. 18, 2003.

SUMMARY

The present disclosure provides a system and a method for reducing exhaust gas of a hybrid electric vehicle having advantages of reducing the exhaust gas by performing a catalyst heating and warm up control of an engine in a charge depleting (CD) mode improving an all electric range (AER) at the time of performing a conversion into a charge sustaining (CS) mode while driving the hybrid electric vehicle.

An exemplary form of the present disclosure provides a system for reducing exhaust gas of a hybrid electric vehicle including: a battery management system measuring a state of charge (SOC) of a high voltage battery of the hybrid electric vehicle; a motor control unit controlling a driving motor with power of the high voltage battery to generate motor driving force; an engine control unit controlling an engine to generate engine driving force; and a hybrid control unit configured to calculate an all electric range (AER) of the hybrid electric vehicle while driving in a charge depleting (CD) mode to perform a catalyst heating and warm up control by starting the engine in the CD mode when the calculated AER exceeds a reference AER selected from reference AER data.

The hybrid control unit may store a reference AER data (e.g., reference AER table), and the reference AER data are set to meet a fuel efficiency certification label or an expected level of a consumer based on the SOC of the high voltage battery.

The battery management system may measure an initial SOC at the time when a driving of the hybrid electric vehicle is initiated, and the hybrid control unit sets a reference AER, among the reference AER data, according to the initial SOC.

The hybrid control unit may enter the catalyst heating and warm up control in an SOC offset section to perform the catalyst heating and warm up control even though the checked AER exceeds the reference AER.

The hybrid control unit may calculate an exhaust control time, which is a time to complete the catalyst heating and warm up control, based on a current temperature of a coolant, and calculate the SOC offset section by multiplying the exhaust control time by a decreasing rate of the SOC in the CD mode.

The hybrid control unit may calculate an allowed reference SOC of the battery by adding the SOC offset section to a charge depleting (CD)/charge sustaining (CS) mode conversion reference SOC, and the hybrid control unit may initiate the catalyst heating and warm up control when a current SOC arrives at the allowed reference SOC.

The hybrid control unit may control driving force of the vehicle by the driving motor at the time of performing the catalyst heating and warm up control in the CD mode and control the engine so as to perform a low load driving only at a critical point or less of engine power to perform the catalyst heating and warm up control.

Another form of the present disclosure provides a method for reducing exhaust gas of a hybrid electric vehicle using a processor of a hybrid control unit, including: setting, by the processor, a reference all electric range (AER) according to an initial state of charge (SOC) of a high voltage battery when the hybrid electric vehicle is stated; driving, by the processor, the hybrid electric vehicle in a charge depleting (CD) mode by driving a driving motor; checking, by the processor, the AER of the hybrid electric vehicle while driving in the CD mode to determine whether or not the checked AER exceeds the reference AER; and performing, by the processor, a catalyst heating and warm up control by starting an engine in the CD mode in the case in which the checked AER exceeds the reference AER.

The performing of the catalyst heating and warm up control by starting the engine in the CD mode may include entering the catalyst heating and warm up control in an SOC offset section necessary to perform the catalyst heating and warm up control even though the checked AER exceeds the reference AER.

The performing of the catalyst heating and warm up control by starting the engine in the CD mode may further include calculating an exhaust control time, which is a time to complete the catalyst heating and warm up control, based on a current temperature of a coolant; calculating the SOC offset section by multiplying the exhaust control time by a decreasing rate of the SOC in the CD mode; calculating an allowed reference SOC of the high voltage battery by adding the SOC offset section to a charge depleting (CD)/charge sustaining (CS) mode conversion reference SOC; and initiating the catalyst heating and warm up control in a state in which the CD mode is maintained when a current SOC of the high voltage battery arrives at the allowed reference SOC.

The method may further include maintaining the CD mode and prohibiting the catalyst heating and warm up control when the checked AER is less than the reference AER or a current SOC of the high voltage battery is greater than an allowed reference SOC of the high voltage battery.

In the performing of the catalyst heating and warm up control by starting the engine in the CD mode, the engine may be controlled to perform a low load driving corresponding to engine power to perform only the catalyst heating and warm up control.

According to one form of the present disclosure, the exhaust performance may be improved to a level at which marketability associated with the AER felt by a consumer is not deteriorated by performing the catalyst heating and warm up control in the CD mode in the case in which a sufficient AER is implemented by checking the AER according to the driving of the vehicle.

In addition, even in the case in which a reference AER is exceeded in the CD mode of the hybrid electric vehicle, the AER may be significantly extended by delaying a timing of starting the engine for the catalyst heating and warm up control.

In addition, since the catalyst heating and warm up control may be performed in the CD mode which is driven by the driving motor, the engine is driven only at the critical point or less of the engine power for an exhaust control regardless of a high load condition of the vehicle, thereby making it possible to reduce the exhaust gas.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
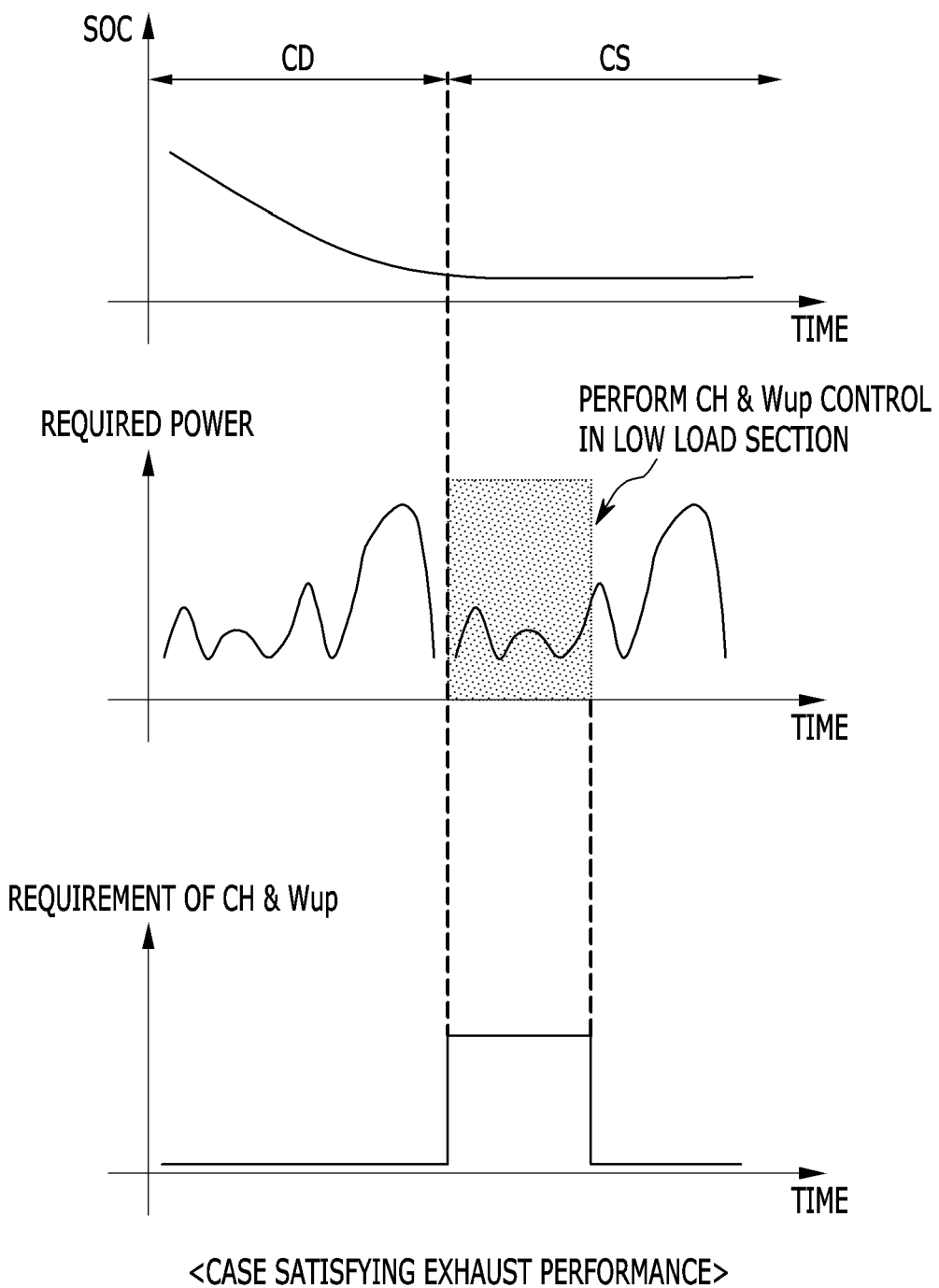
FIG. 1 illustrates a warm up control of a case in which required power of a hybrid electric vehicle according to the related art is small.
Figure 2:
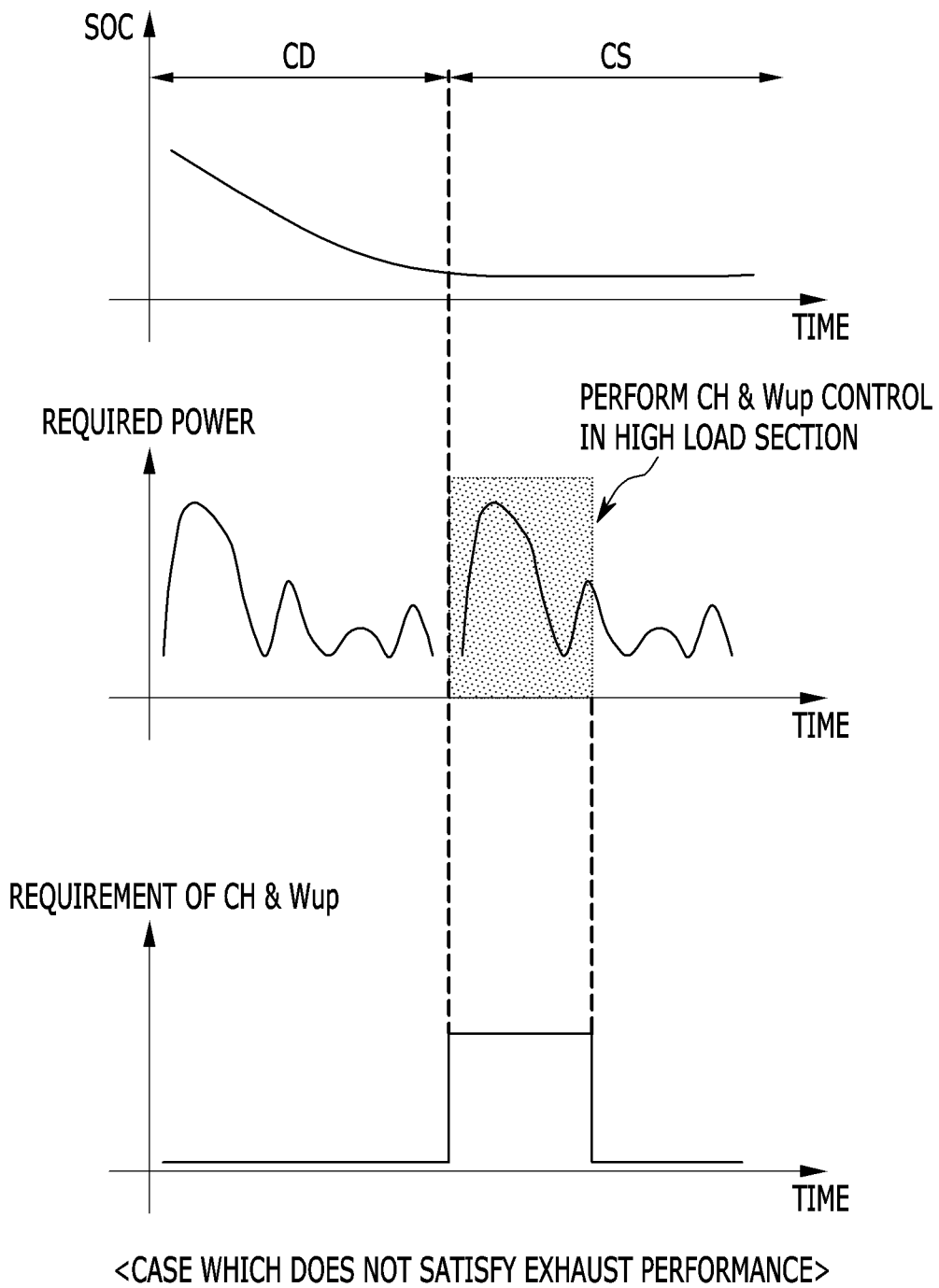
FIG. 2 illustrates the warm up control of a case in which required power of the hybrid electric vehicle according to the related art is large.

The drawings described herein are for illustration purposes only and are not intended to limit the scope of the present disclosure in any way.

DESCRIPTION OF SYMBOLS

100: system for reducing exhaust gas
110: battery management system
120: motor control unit
130: engine control unit
140: hybrid control unit

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

Hereinafter, a system and a method for reducing exhaust gas of a hybrid electric vehicle according to an exemplary form of the present disclosure will be described in detail with reference to the accompanying drawings.

Figure 3:
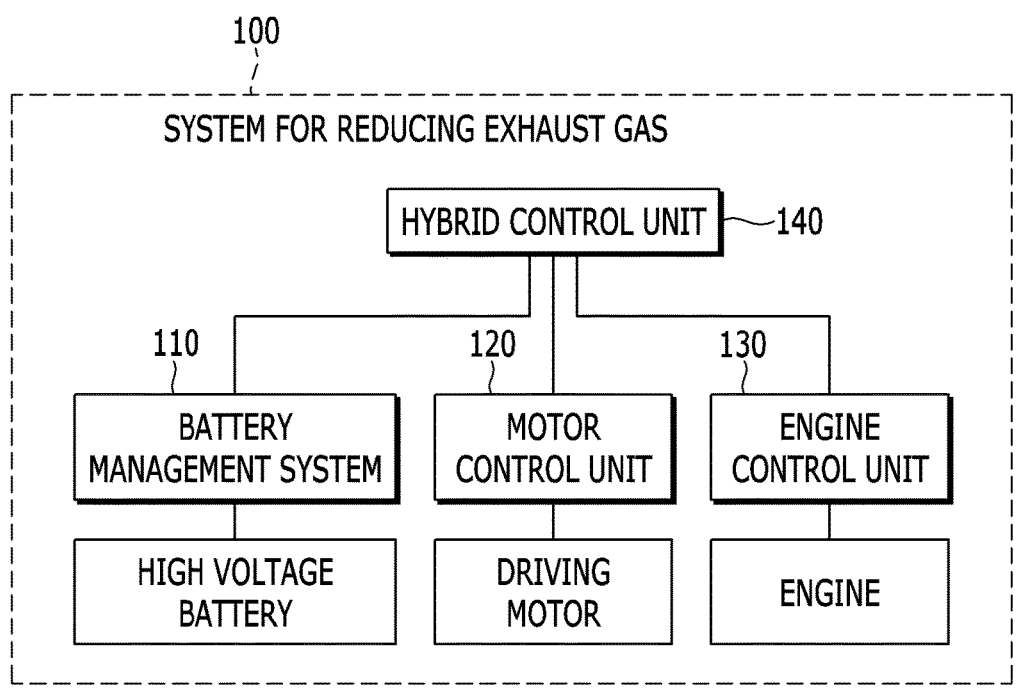
FIG. 3 illustrates a configuration of a system for reducing exhaust gas of a hybrid electric vehicle according to an exemplary form of the present disclosure.

FIG. 3 illustrates a configuration of a system for reducing exhaust gas of a hybrid electric vehicle according to an exemplary form of the present disclosure.

Referring to FIG. 3, a system 100 for reducing exhaust gas of a hybrid electric vehicle according to an exemplary form of the present disclosure includes a battery management system (BMS) 110, a motor control unit (MCU) 120, an engine control unit (ECU) 130, and a hybrid control unit (HCU) 140.

The battery management system 110 measures a state of charge (SOC) of a high voltage battery and provides the measured SOC so that a variety of control units in the vehicle may refer to the measured SOC.

The battery management system 110 may include an intelligent battery sensor (IBS) and may precisely measure a voltage, a current, a surrounding temperature of the battery across an entire region to measure the SOC of the battery based on the measured voltage, current, and temperature of the battery.

The motor control unit 120 controls a driving motor with power of the high voltage battery according to control instruction of the hybrid control unit 140 to generate motor driving force of the vehicle.

The engine control unit 130 starts the engine according to the control instruction of the hybrid control unit 140 to generate engine driving force of the vehicle.

The engine control unit 130 starts the engine in the case in which required power is not satisfied with the driving motor or the SOC of the high voltage battery is consumed to a predetermined level, to generate the engine driving force.

Typically, in the case in which the required power according to an initial driving condition after entering the CS mode is small, the engine control unit 130 performs the catalyst heating and warm up control (CH & Wup) in a low required power section in order to improve exhaust performance. However, in the case in which the required power is large after entering the CS mode, a high required power section is encountered, such that the exhaust gas is excessively discharged, thereby deteriorating the exhaust performance.

In order to solve this problem, the engine control unit 130 according to an exemplary form of the present disclosure may perform the catalyst heating and warm up control in advance in an SOC offset section of the CD mode, which is before the conversion into the CS mode, according to the control instruction of the hybrid control unit 140 to be described below.

However, in the case in which the catalyst heating and warm up control is performed in advance in the CD mode, the above-mentioned problem in that the all electric range (AER) is decreased, by which the fuel efficiency certification value of the vehicle and marketability felt by the consumer may be deteriorated, needs to be solved.

Thus, in order to solve this problem, the hybrid control unit 140 according to an exemplary form of the present disclosure performs a control so that the catalyst heating and warm up control is performed in the CD mode only in the case in which a sufficient AER is implemented to exceed a preset reference AER by checking the AER according to a driving of the vehicle.

The hybrid control unit 140 is a superordinate control unit that is in cooperation with various control units associated with the driving of the hybrid electric vehicle to perform a control so that optimal exhaust performance may be maintained.

Figure 4:
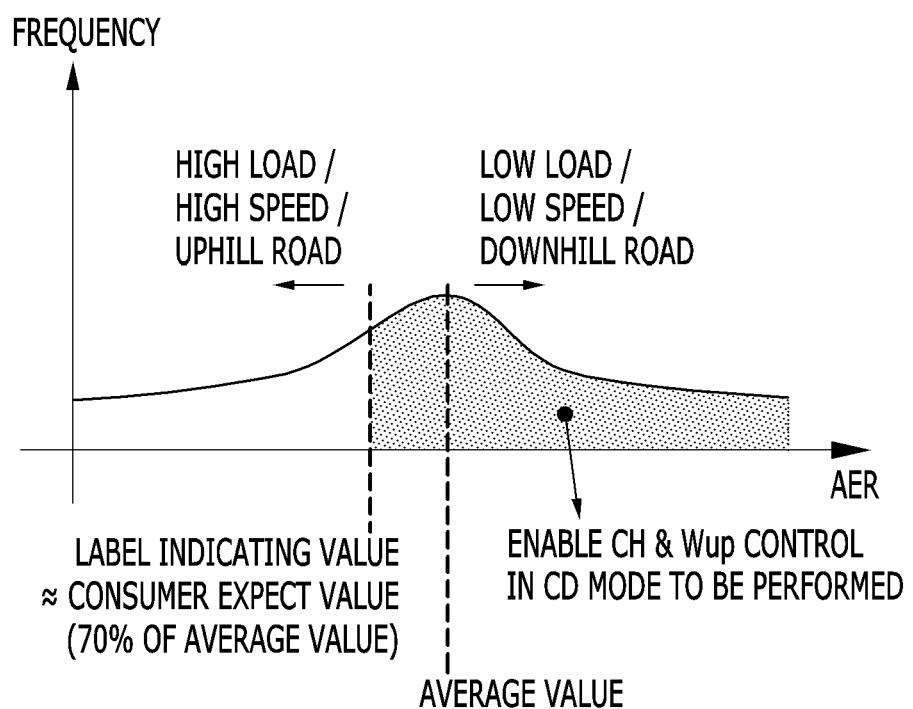
FIG. 4 illustrates a distance condition for a catalyst heating and warm up control in a charge depleting (CD) mode according to an exemplary form of the present disclosure.

FIG. 4 illustrates a distance condition for the catalyst heating and warm up control in the charge depleting (CD) mode according to an exemplary form of the present disclosure.

Referring to FIG. 4, even in the case in which the SOC is equal due to a full charge of the battery at the time of starting the driving of the vehicle, the AER may be varied depending on a driving condition of the vehicle.

For example, in the case in which the hybrid electric vehicle drives in low load, low speed, and downhill road sections, the AER is increased, but in the case in which the hybrid electric vehicle drives in high load, high speed, and uphill road sections, the AER is decreased.

The hybrid control unit 140 stores a reference AER table meeting a fuel efficiency certification label or an expected level of the consumer based on the SOC of the high voltage battery.

The hybrid control unit 140 measures an initial SOC of the high voltage battery by the battery management system 110 at the time of starting the driving of the hybrid electric vehicle and sets a reference AER according to the initial SOC with reference to the reference AER table.

In addition, the hybrid control unit 140 continuously measures the AER according to the driving of the hybrid electric vehicle, and transmits instruction of reducing the exhaust gas to the engine control unit 130 so as to perform the catalyst heating and warm up control in the CD mode in the case in which the measured AER exceeds the preset reference AER.

Figure 5:
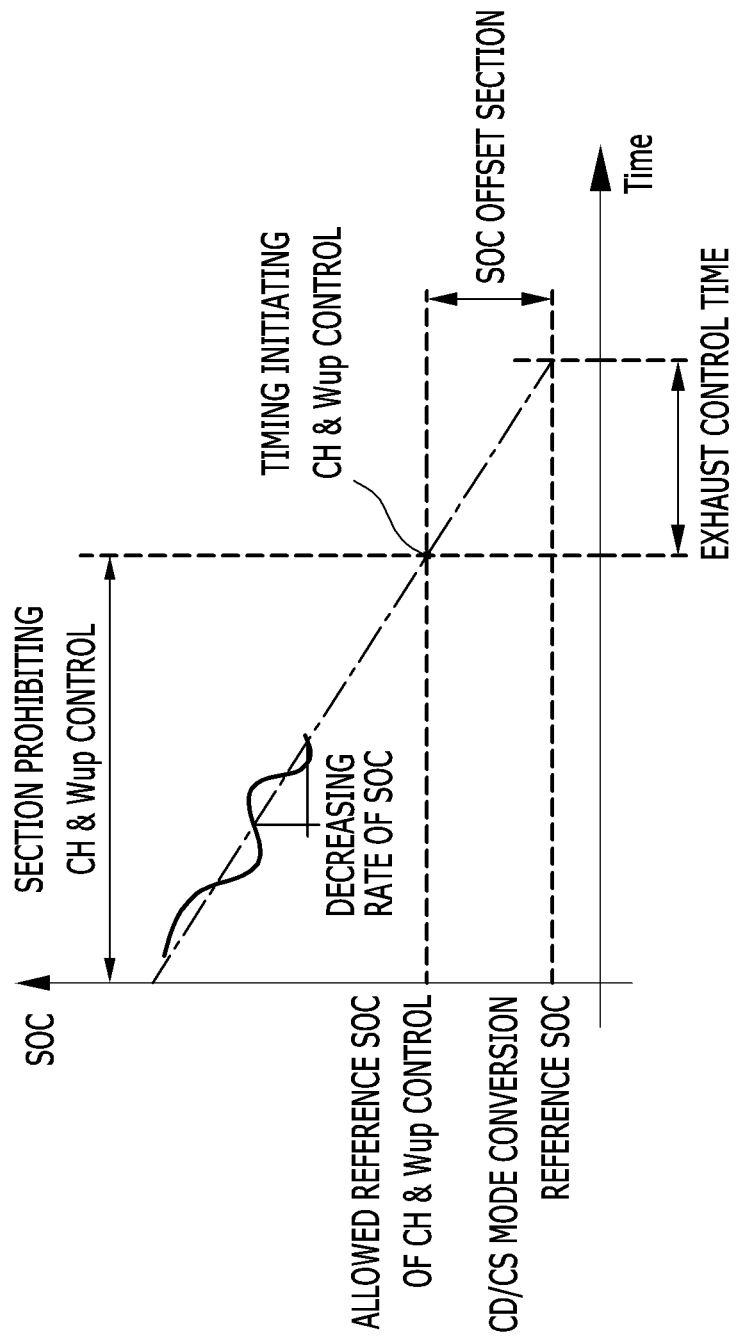
FIG. 5 illustrates a state of charge (SOC) condition for the catalyst heating and warm up control in the CD mode according to an exemplary form of the present disclosure.

Meanwhile, FIG. 5 illustrates a state of charge (SOC) condition for the catalyst heating and warm up control in the CD mode according to an exemplary form of the present disclosure.

Referring to FIG. 5, the hybrid control unit 140 enters the catalyst heating and warm up control only in the SOC offset section to perform the catalyst heating and warm up control even in the case in which a current driving distance exceeds the reference AER while driving in the CD mode.

Here, the SOC offset section may be calculated by multiplying a decreasing rate of the SOC (dSOC/dt) with an exhaust control time, wherein the exhaust control time, which is a time to complete the catalyst heating and warm up control, may be calculated based on a current temperature of a coolant.

Thus, the hybrid control unit 140 may calculate the SOC offset section by checking the decreasing rate of the SOC in the CD mode of the vehicle and referring to the exhaust control time which is expected according to the temperature of the coolant.

In addition, the hybrid control unit 140 calculates an allowed reference SOC of the catalyst heat and warm up control by adding the SOC offset section to a CD/CS mode conversion reference SOC, and initiates the exhaust control when a current SOC of the high voltage battery arrives at the allowed reference SOC of the catalyst heating and warm up control.

That is, the hybrid control unit 140 prohibits an immediate catalyst heating and warm up control in the case in which the SOC of the high voltage battery is larger than the allowed reference SOC of the catalyst heating and warm up control, and initiates the exhaust control in the case in which the SOC of the high voltage battery is equal to the allowed reference SOC of the catalyst heating and warm up control.

Thus, even in the case in which the current driving distance exceeds the reference AER in the CD mode of the hybrid electric vehicle, the hybrid control unit 140 may significantly extend the AER by delaying the timing of starting the engine for the catalyst heating and the warm up control.

Figure 6:
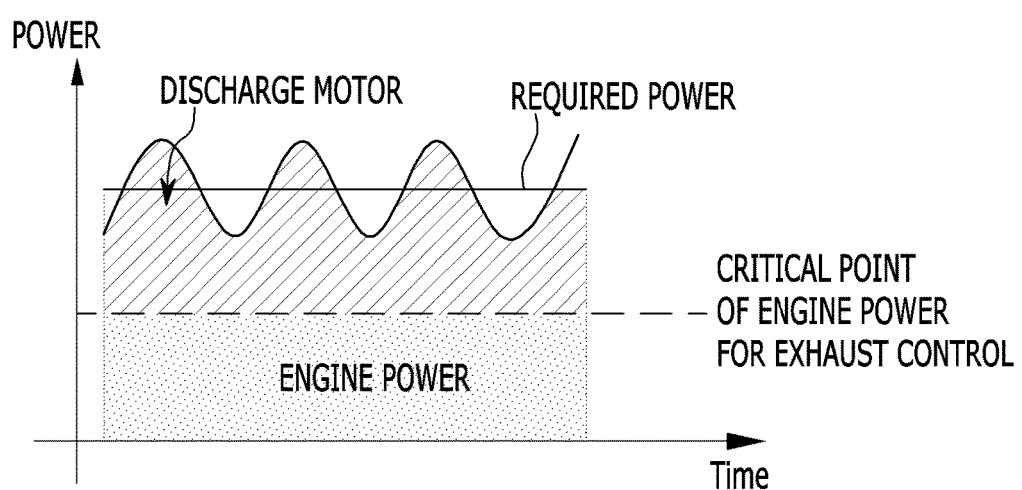
FIG. 6 illustrates a method for distributing power at the time of performing the catalyst heating and warm up control in the CD mode according to an exemplary form of the present disclosure.

Meanwhile, FIG. 6 illustrates a method for distributing power at the time of performing the catalyst heating and the warm up control in the CD mode according to an exemplary form of the present disclosure.

Referring to FIG. 6, the hybrid control unit 140 according to an exemplary form of the present disclosure controls driving force of the vehicle by a driving motor, since the CD mode is basically a section driven by the driving motor at the time of performing the catalyst heating and warm up control in the CD mode. In addition, the engine is controlled to perform a low load driving only at a critical point or less of the engine power to perform the catalyst heating and warm up control.

That is, the hybrid control unit 140 transfers an instruction according to the required power of the vehicle to the motor control unit 120, and transfers a control instruction to the engine control unit 130 so as to be driven only at the critical point or less of the engine power for the exhaust performance of the engine.

Thus, since the engine may perform the catalyst heating and warm up control while maintaining the low required power in the CD mode driven by the driving power of the driving motor, the exhaust gas may be reduced regardless of the driving condition of the vehicle.

Meanwhile, a method for reducing exhaust gas of a hybrid electric vehicle according to an exemplary form of the present disclosure will be described with reference to FIG. 7 based on the configuration of the system for reducing exhaust gas of a hybrid electric vehicle described above.

Figure 7:
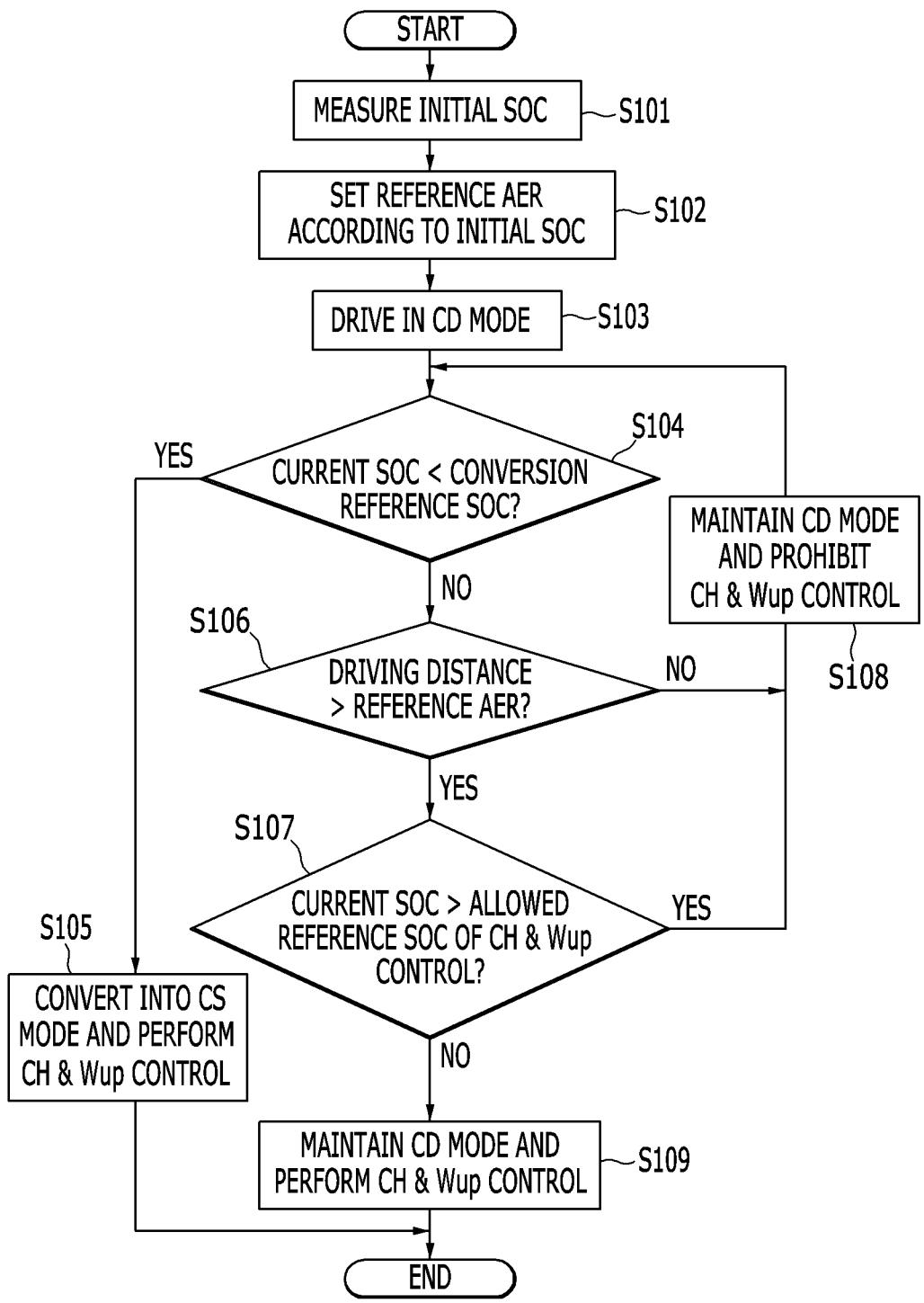
FIG. 7 is a flow chart illustrating a method for reducing exhaust gas of a hybrid electric vehicle according to an exemplary form of the present disclosure.

FIG. 7 is a flow chart schematically illustrating a method for reducing exhaust gas of a hybrid electric vehicle according to an exemplary form of the present disclosure.

Referring to FIG. 7, the hybrid control unit 140 measures an initial SOC of the high voltage battery when the hybrid electric vehicle is started (S101).

The hybrid control unit 140 sets a reference AER according to the initial SOC with reference to the reference AER table meeting the fuel efficiency certification label or the expected level of the consumer (S102).

The hybrid control unit 140 drives the driving motor according to the required power of the hybrid electric vehicle to perform the driving in the CD mode (S103).

The hybrid control unit 140 checks a current SOC of the high voltage battery by the battery management system 110 in real time.

If the current SOC is less than the CD/CS mode conversion reference SOC (Yes in S104), the hybrid control unit 140 performs the conversion into the CS mode and performs the catalyst heating and warm up (CH & Wup) control in order to maintain a predetermined SOC level (S105).

On the other hand, in a good state in which the current SOC of the high voltage battery is the CD/CS conversion reference SOC or more (No in S104), if a current driving distance exceeds the reference AER (Yes in S106), the hybrid control unit 140 determines that a first condition performing the catalyst heating and warm up control in the CD mode is satisfied.

In addition, if the current SOC arrives the allowed reference SOC of the catalyst heating and warm up control (No in S107), the hybrid control unit 140 determines that a second condition performing the catalyst heating and warm up control is satisfied, such that the vehicle may perform the catalyst heating and warm up control in the CD mode.

If the current SOC is greater than the allowed reference SOC of the catalyst heating and warm up control even though it satisfies the first condition (Yes in S107), the hybrid control unit 140 maintains the CD mode as it is and prohibits the catalyst heating and warm up control, thereby significantly delaying the catalyst heating and warm up control (S108).

Thereafter, if the current SOC arrives at the allowed reference SOC of the catalyst heating and warm up control (No in S107), the hybrid control unit 140 performs the catalyst heating and warm up control in a state in which the CD mode is maintained (S109).

In this case, the catalyst heating and warm up control is performed in the SOC offset section calculated based on the decreasing rate of the SOC and the exhaust gas control time. The exhaust gas control time may be calculated based on the current temperature of the coolant.

If the current SOC arrives at the CD/CS mode conversion reference SOC after the hybrid control unit 140 performs the catalyst heating and warm up control, the hybrid control unit 140 performs the conversion into the CS mode.

Meanwhile, in the operation of S106, if the current driving distance does not exceed the reference AER which is preset (No in S106), the hybrid control unit 140 maintains the CD mode and prohibits the catalyst heating and warm up control.

Although the above description has described that the hybrid control unit 140 sequentially determines the first condition in which the driving distance exceeds the reference AER, and the second condition in which the SOC arrives the allowed reference SOC of the catalyst heating and warm up control, the present disclosure is not limited thereto. For example, it may be apparent that whether or not the two conditions are satisfied may be determined by changing a determination order.

As such, according to an exemplary form of the present disclosure, the exhaust performance may be improved to a level at which marketability associated with the AER felt by a consumer is not deteriorated by performing the catalyst heating and the warm up control in the CD mode in the case in which a sufficient AER is implemented by checking the AER according to the driving of the vehicle.

In addition, even in the case in which the reference AER is exceeded in the CD mode of the hybrid electric vehicle, the AER may be significantly extended by delaying the timing of starting the engine for the catalyst heating and the warm up control.

In addition, since the catalyst heating and the warm up control may be performed in the CD mode which is driven by the driving motor, the engine is driven only at the critical point or less of the engine power for the exhaust control regardless of the high load condition of the vehicle, thereby making it possible to reduce the exhaust gas.

The above-mentioned exemplary forms of the present disclosure are not embodied only by an apparatus and method. Alternatively, the above-mentioned exemplary forms may be embodied by a program performing functions, which correspond to the configuration of the exemplary forms of the present disclosure, or a recording medium on which the program is recorded. These forms can be easily devised from the description of the above-mentioned exemplary forms by those skilled in the art to which the present disclosure pertains.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the appended claims.

What is claimed is:

1. A system for reducing exhaust gas of a hybrid electric vehicle, the system comprising:
   a battery management system configured to measure a state of charge (SOC) of a high voltage battery of the hybrid electric vehicle;
   a motor control unit configured to control a driving motor with power of the high voltage battery to generate motor driving force;
   an engine control unit configured to control an engine to generate an engine driving force; and
   a hybrid control unit configured to calculate an all electric range (AER) of the hybrid electric vehicle while driving in a charge depleting (CD) mode and configured to perform a catalyst heating and warm up control by starting the engine in the CD mode when the calculated AER exceeds a reference AER selected from reference AER data.

2. The system according to claim 1, wherein the hybrid control unit is configured to store the reference AER data, and the reference AER data is set to meet a fuel efficiency certification label or an expected level of a consumer based on the SOC of the high voltage battery.

3. The system according to claim 2, wherein the battery management system is configured to measure an initial SOC when a driving of the hybrid electric vehicle is initiated, and the hybrid control unit sets the reference AER, among the reference AER data, corresponding to the initial SOC.

4. The system according to claim 1, wherein the hybrid control unit is configured to enter the catalyst heating and warm up control in an SOC offset section to perform the catalyst heating and warm up control even though the calculated AER exceeds the reference AER.

5. The system according to claim 4, wherein the hybrid control unit is configured to calculate an exhaust control time corresponding to a time to complete the catalyst heating and warm up control, based on a current temperature of a coolant, and the hybrid control unit is configured to calculate the SOC offset section by multiplying the exhaust control time by a decreasing rate of the SOC in the CD mode.

6. The system according to claim 4, wherein the hybrid control unit is configured to calculate an allowed reference SOC of the high voltage battery by adding the SOC offset section to a charge depleting (CD)/charge sustaining (CS) mode conversion reference SOC, and the hybrid control unit is configured to initiate the catalyst heating and warm up control when a current SOC arrives at the allowed reference SOC.

7. The system according to claim 1, wherein the hybrid control unit is configured to control driving force of the vehicle by the driving motor at a time of performing the catalyst heating and warm up control in the CD mode and configured to control the engine to perform a low load driving corresponding to engine power desired to perform only the catalyst heating and warm up control.

8. A method for reducing exhaust gas of a hybrid electric vehicle using a hybrid control unit, the method comprising:
   setting, by a processor of a hybrid control unit, a reference all electric range (AER) according to an initial state of charge (SOC) of a high voltage battery when the hybrid electric vehicle is started;
   driving, by the processor, the hybrid electric vehicle in a charge depleting (CD) mode by driving a driving motor;
   checking, by the processor, an AER of the hybrid electric vehicle while driving in the CD mode, and determining whether the checked AER exceeds the reference AER; and
   performing, by the processor, a catalyst heating and warm up control by starting an engine in the CD mode when the checked AER exceeds the reference AER.

9. The method according to claim 8, wherein the step of performing of the catalyst heating and warm up control includes entering the catalyst heating and warm up control in an SOC offset section to perform the catalyst heating and warm up control even though the checked AER exceeds the reference AER.

10. The method according to claim 9, wherein the step of performing of the catalyst heating and warm up control further includes:
    calculating an exhaust control time, which is a time to complete the catalyst heating and warm up control, based on a current temperature of a coolant;
    calculating the SOC offset section by multiplying the exhaust control time by a decreasing rate of the SOC in the CD mode;
    calculating an allowed reference SOC of the high voltage battery by adding the SOC offset section to a charge depleting (CD)/charge sustaining (CS) mode conversion reference SOC; and
    initiating the catalyst heating and warm up control in the CD mode when a current SOC of the high voltage battery arrives at the allowed reference SOC.

11. The method according to claim 10, further comprising:
    maintaining the CD mode; and
    prohibiting the catalyst heating and warm up control when the checked AER is less than the reference AER or a current SOC of the high voltage battery is greater than the allowed reference SOC of the high voltage battery.

12. The method according to claim 8, wherein in the performing of the catalyst heating and warm up control in the CD mode, the engine is controlled to perform a low load driving corresponding to engine power to perform only the catalyst heating and warm up control.

* * * * *